United States Patent
Wang et al.

(10) Patent No.: US 10,012,861 B2
(45) Date of Patent: Jul. 3, 2018

(54) DISPLAY PANEL WITH DISPLAY EFFECT OF NARROWED OR NON-EDGE FRAME AND DISPLAY DEVICE WITH DISPLAY PANEL

(71) Applicant: BOE TECHNOLOGY GROUP CO., LTD., Beijing (CN)

(72) Inventors: Can Wang, Beijing (CN); Wei Wang, Beijing (CN); Wenbin Yang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 122 days.

(21) Appl. No.: 14/910,056

(22) PCT Filed: Aug. 6, 2015

(86) PCT No.: PCT/CN2015/086220
§ 371 (c)(1),
(2) Date: Feb. 4, 2016

(87) PCT Pub. No.: WO2016/127604
PCT Pub. Date: Aug. 18, 2016

(65) Prior Publication Data
US 2016/0370644 A1 Dec. 22, 2016

(30) Foreign Application Priority Data
Feb. 10, 2015 (CN) .......................... 2015 1 0069576

(51) Int. Cl.
G02F 1/1335 (2006.01)
G02F 1/1333 (2006.01)
G02F 1/1368 (2006.01)

(52) U.S. Cl.
CPC ...... *G02F 1/133502* (2013.01); *G02F 1/1368* (2013.01); *G02F 1/133308* (2013.01);
(Continued)

(58) Field of Classification Search
CPC combination set(s) only.
See application file for complete search history.

(56) References Cited

U.S. PATENT DOCUMENTS

| 2004/0051944 A1 | 3/2004 | Stark |
| 2006/0077544 A1* | 4/2006 | Stark ................... G02F 1/13336 359/448 |

(Continued)

FOREIGN PATENT DOCUMENTS

| CN | 103592710 A | 2/2014 |
| CN | 104133310 A | 11/2014 |

(Continued)

OTHER PUBLICATIONS

Second Chinese Office Action, for Chinese Patent Application No. 201510069576.8, dated May 12, 2017, 14 pages.
(Continued)

*Primary Examiner* — Lauren Nguyen
(74) *Attorney, Agent, or Firm* — Kinney & Lange, P.A.

(57) ABSTRACT

The present invention discloses a display panel and a display device. The display panel comprises: a cover plate, a first substrate and a second substrate stacked on top of one another; display functional stacked layers located between the first substrate and the second substrate, the display functional stacked layers having an image display region and an edge frame region; an isolation layer located between the first substrate and the cover plate, the isolation layer having a refractive index different from those of the first substrate and the cover plate, and wherein the first substrate is formed with a curved first light deflection surface at an edge thereof, the first light deflection surface being configured to deflect light from the edge portion of the image display region of the display functional stacked layers towards an edge of the cover plate, and the cover plate is formed with a curved second light deflection surface at the (Continued)

edge thereof, the second light deflection surface being configured to deflect light deflected by the first light deflection surface away from the edge of the cover plate. The display panel and the display device can achieve a display effect of narrowed edge frame or non-edge frame.

11 Claims, 3 Drawing Sheets

(52) U.S. Cl.
CPC .. *G02F 1/133514* (2013.01); *G02F 1/133526* (2013.01); *G02F 1/133606* (2013.01); *G02F 2001/133302* (2013.01); *G02F 2001/133331* (2013.01)

(56) References Cited

U.S. PATENT DOCUMENTS

2012/0111479 A1\* 5/2012 Sung ................ B32B 17/10036
156/102

2013/0050613 A1\* 2/2013 Ohshima ........... G02F 1/133526
349/62

FOREIGN PATENT DOCUMENTS

| | | |
|---|---|---|
| CN | 204087706 U | 1/2015 |
| CN | 104597653 A | 5/2015 |
| JP | 2000180964 A | 6/2000 |
| JP | 2011107442 A | 6/2011 |

OTHER PUBLICATIONS

First Chinese Office Action (including English translation) dated Dec. 30, 2016, for corresponding Chinese pplication No. 201510069576.8.
International Search Report dated Nov. 30, 2015 for corresponding PCT Application No. PCT/CN2015/086220.
Written Opinion and English translation of Box V dated Nov. 9, 2015 for corresponding PCT Application No. PCT/CN2015/086220.

\* cited by examiner

DISPLAY PANEL WITH DISPLAY EFFECT OF NARROWED OR NON-EDGE FRAME AND DISPLAY DEVICE WITH DISPLAY PANEL

BACKGROUND OF THE INVENTION

Field of the Invention

The present disclosure relates to the field of display technologies, and particularly, to a display panel and a display device.

Description of the Related Art

Display devices have been developed and changed rapidly, and particularly with growth of touch display panels, a display panel with a narrow edge frame has become a tendency. However, at present, presence of the edge frame is mainly limited to circuit leadings and cutting allowance in the edge frame; if it is desired to narrow or remove the edge frame by changing peripheral circuits, it is required to arrange complex drive circuits within a very limited range, which will necessarily increase design difficulty of the and drive circuits and challenge limit of accuracy of devices. Meanwhile, a reduction in the cutting allowance will also increase process difficulty. Thus, it is still a challenging issue in further narrowing and even removing the edge frame of the display panel in prior arts.

SUMMARY OF THE INVENTION

An object of the present disclosure is to provide a display panel enabling a display effect of narrowed edge frame or non-edge frame.

A further object of the present disclosure is to provide a display device comprising the above display panel.

In order to achieve the above objects, technique solutions of the present disclosure are implemented as follows:

Embodiments of the present disclosure provide a display panel, comprising:

a cover plate, a first substrate and a second substrate stacked on top of one another, the cover plate and the second substrate being located on either side of the first substrate respectively and the cover plate being located on a light emitting side of the display panel;

display functional stacked layers located between the first substrate and the second substrate, the display functional stacked layers having an image display region for displaying an image and an opaque edge frame region arranged to surround the image display region at edges of the display functional stacked layers;

an isolation layer located between the first substrate and the cover plate, the isolation layer having a refractive index different from those of the first substrate and the cover plate, and wherein the first substrate is formed with a curved first light deflection surface at an edge thereof, the first light deflection surface being located on a side of the first substrate facing the isolation layer, covering the edge frame region and an edge portion of the image display region of the display functional stacked layers and being configured to deflect light from the edge portion of the image display region of the display functional stacked layers towards an edge of the cover plate, and the cover plate is formed with a curved second light deflection surface at the edge thereof, the second light deflection surface being located on a side of the cover plate facing the isolation layer, covering the edge frame region and an edge portion of the image display region of the display functional stacked layers and being configured to deflect light deflected by the first light deflection surface away from the edge of the cover plate.

In one embodiment, the first light deflection surface and the second light deflection surface are configured so that a region of the cover plate from which the light deflected by the second light deflection surface is emitted out at least partially covers the edge frame region of the display functional stacked layers.

In one embodiment, the first light deflection surface and the second light deflection surface are configured so that the region of the cover plate from which the light deflected by the second light deflection surface is emitted out completely covers the edge frame region of the display functional stacked layers.

In one embodiment, the refractive index of the isolation layer is smaller than those of the first substrate and the cover plate, and the first light deflection surface and the second light deflection surface are curved together towards the cover plate.

In one embodiment, the first light deflection surface is configured so that a sine value of an angle of incidence, at which light perpendicularly incident into the first substrate from the edge portion of the image display region of the display functional stacked layers is incident onto the first light deflection surface, is smaller than a ratio of the refractive index of the isolation layer to the refractive index of the first substrate.

In one embodiment, the refractive index of the isolation layer is larger than those of the first substrate and the cover plate, and first light deflection surface and second light deflection surface are curved together towards the first substrate.

In one embodiment, the second light deflection surface is configured so that a sine value of an angle of incidence, at which the light deflected by the first light deflection surface is incident onto the second light deflection surface, is smaller than a ratio of the refractive index of the cover plate to the refractive index of the isolation layer.

In one embodiment, the first light deflection surface and the second light deflection surface are configured so that parallel light from the edge portion of the image display region of the display functional stacked layers is still parallel light after deflected by the first light deflection surface and the second light deflection surface.

In one embodiment, pixels in the edge portion of the image display region of the display functional stacked layers are arranged more densely than those in other portions of the image display region.

In one embodiment, the display functional stacked layers comprises in sequence:

a color filter layer, a liquid crystal layer and a thin film transistor layer.

In one embodiment, the isolation layer is a glass layer, an air layer or a transparent adhesive layer.

Embodiments of the present disclosure further provide a display device, comprising:

the display panel according to any of the above embodiments; and a backlight located outside of the second substrate of the display panel.

With at least one embodiment of the present disclosure as described above, light deflection surfaces can be used to deflect light from the edge of the image display region so as to cover the edge frame region, thereby achieving a display effect of narrowed edge frame or non-edge frame. With the display panel and the display device according to the embodiments of the present disclosure, a greater degree of freedom can be provided for achieving the display effect of narrowed edge frame or non-edge frame, thereby reducing process difficulty.

DETAILED DESCRIPTION OF PREFERRED EMBODIMENTS OF THE INVENTION

Figure 1:
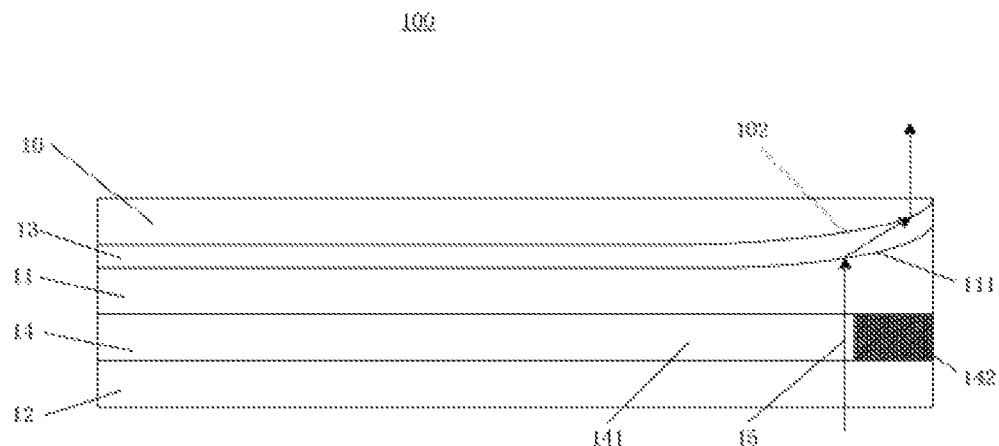
FIG. 1 is a schematic diagram showing a stacked arrangement of a display panel according to an embodiment of the present disclosure.

Technical solutions of the present disclosure will be further described in detail in combination with exemplary embodiments with reference to the attached drawings. In the description, the same or like reference numbers refer to the same or like elements. The following description of exemplary embodiments of the present disclosure made with reference to the attached drawings is intended to illustrate the general inventive concepts of the present disclosure, and should not be interpreted as being limitative to the present disclosure.

Further, in the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, there is provided a display panel, comprising: a cover plate, a first substrate and a second substrate stacked on top of one another, the cover plate and the second substrate being located on either side of the first substrate respectively and the cover plate being located on a light emitting side of the display panel; display functional stacked layers located between the first substrate and the second substrate, the display functional stacked layers having an image display region for displaying an image and an opaque edge frame region arranged to surround the image display region at edges of the display functional stacked layers; an isolation layer located between the first substrate and the cover plate, the isolation layer having a refractive index different from those of the first substrate and the cover plate, and wherein the first substrate is formed with a curved first light deflection surface at an edge thereof, the first light deflection surface being located on a side of the first substrate facing the isolation layer, covering the edge frame region and an edge portion of the image display region of the display functional stacked layers and being configured to deflect light from the edge portion of the image display region of the display functional stacked layers towards an edge of the cover plate, and the cover plate is formed with a curved second light deflection surface at the edge thereof, the second light deflection surface being located on a side of the cover plate facing the isolation layer, covering the edge frame region and an edge portion of the image display region of the display functional stacked layers and being configured to deflect light deflected by the first light deflection surface away from the edge of the cover plate.

FIG. 1 schematically shows a structure of a display panel 100 according to one embodiment of the present disclosure. The display panel 100 may comprise: a cover plate 10, a first substrate 11 and a second substrate 12 stacked on top of one another, display functional stacked layers 14 located between the first substrate 11 and the second substrate 12, and an isolation layer 13 located between the first substrate 11 and the cover plate 10. In one example, the cover plate 10 and the second substrate 12 are located on either side of the first substrate 11 respectively and the cover plate 10 located on a light emitting side of the display panel 100. The display functional stacked layers 14 have an image display region 141 for displaying an image and an opaque edge frame region 142 arranged to surround the image display region 141 at edges of the display functional stacked layers.

In one example, the first substrate 11 is formed with a curved first light deflection surface 111 at an edge thereof, the first light deflection surface 111 is located on a side of the first substrate 11 facing the isolation layer 13 and covers an edge portion of the image display region 141 of the display functional stacked layers 14, as shown in FIG. 1. The first light deflection surface 111 is configured to deflect light 15 from the edge portion of the image display region 141 of the display functional stacked layers 14 towards an edge of the cover plate 10. Further, the cover plate 10 is formed with a curved the second light deflection surface 102 at the edge thereof, the second light deflection surface 102 is located on a side of the cover plate 10 facing the isolation layer 13 and covers the edge frame region 142 and an edge portion of the image display region 141 of the display functional stacked layers 14. The second light deflection surface 102 is configured to deflect light deflected by the first light deflection surface 111 away from the edge of the cover plate 10. In order to enable deflection of light by the first light deflection surface 111 and the second light deflection surface 102, the refractive index of the isolation layer 13 is set to be different from those of the first substrate 11 and the cover plate 10.

In embodiments according to the present disclosure, the substrate 11 and the cover plate 10 are respectively provided with a light deflection surface at edges thereof, that is, the first light deflection surface 111 and the second light deflection surface 102. The two light deflection surfaces are configured so that light emitted out from the edge of the image display region 141 of the display functional stacked layers 14 of the display panel 100 can be deflected towards the edge of the cover plate 10. As such, when a viewer views an image displayed on the display panel from the light emitting side (the upper side in the example shown in FIG. 1) of the display panel 100, light will also be emitted out at a position of the cover plate 10 corresponding to edge frame region 142 (for example, above the edge frame region 142), so that a display effect of non-edge frame (if light will be emitted out from all edges of the cover plate 10) or narrowed edge frame (if light will be emitted out from parts of edge region of the cover plate 10) can be obtained in the display panel 10.

In one example, the first light deflection surface 111 and the second light deflection surface 102 may be configured so that a region of the cover plate 10 from which the light deflected by the second light deflection surface 102 is emitted out at least partially covers the edge frame region 141 of the display functional stacked layers 14. As such, the edge frame of the display panel 10 may be reduced or even removed when display panel displays an image. Specifically, when the region of the cover plate 10 from which the light deflected by the second light deflection surface 102 is emitted out partially covers the edge frame region 141 of the display functional stacked layers 14, the edge frame of the display panel 10 may be narrowed. Further, the first light deflection surface 111 and the second light deflection surface 102 may be also configured so that the region of the cover plate 10 from which the light deflected by the second light deflection surface 102 is emitted out completely covers the edge frame region 142 of the display functional stacked layers 14. As such, the edge frame of the display panel 10 may not be presented when display panel displays an image.

In embodiments of the present disclosure, the edge frame region 142 is a non-display function region at periphery of the display functional stacked layers 14, for example, may be a region for receiving sealant or peripheral circuits therein.

In one example, the refractive index of the isolation layer 13 may be smaller than those of the first substrate 11 and the cover plate 10, and the first light deflection surface 111 and the second light deflection surface 102 are curved together towards the cover plate 10.

Figure 2:
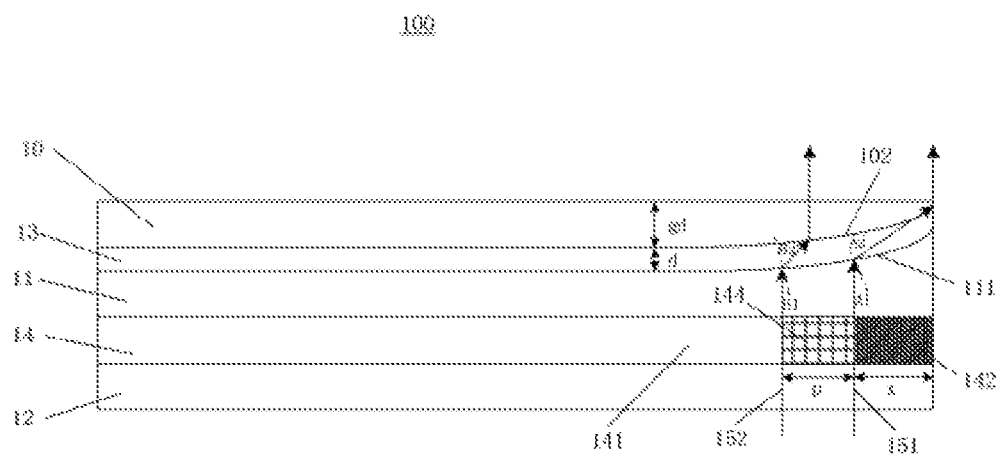
FIG. 2 is a schematic diagram showing optical paths of the display panel shown in FIG. 1.

FIG. 2 shows deflection of light by the first light deflection surface 111 and the second light deflection surface 102 by taking light from an edge pixel 144 in the image display region 141 of the display functional stacked layers 14 as an example. Assuming that the most-right light 151 from the edge pixel 144 is transmitted through the first substrate 11 and incident onto the first light deflection surface 111 at an angle of incidence of A1, with an angle of refraction of A2, the refractive index of the first substrate is n1, the refractive index of the isolation layer 13 is n2, then according to the refraction law, the following formula is satisfied:

$$\frac{\sin A1}{\sin A2} = \frac{n2}{n1}. \qquad (1)$$

When n2 is smaller than n1, light refracted by the first light deflection surface 111 will be deflected towards the edge of the substrate 10. Deflection degree of the light 151 by the first light deflection surface 111 (for example, represented by (A2−A1)) depends on the ratio of n2 to n1. As an example, the width x of the edge frame region 142 and the thickness d of the isolation layer 13 may be determined according to the deflection degree of the light by the first light deflection surface 111. For example, when it is desired light deflected by the first light deflection surface 111 can completely cover the edge frame region 142, the width x of the edge frame region 142 and the thickness d of the isolation layer 13 may be set to satisfy the following formula:

$$\tan(A2 - A1) \geq \frac{x}{d + gd} \qquad (2)$$

where gd is the thickness of the cover plate 10. If a certain allowance is considered, the width x of the edge frame region 142 and the thickness d of the isolation layer 13 may be set to satisfy the following formula:

$$\tan(A2 - A1) \geq \frac{x}{d}. \qquad (3)$$

As an example, when it is desired that a narrow edge frame is kept for the display panel 100, the width x of the edge frame region 142 and the thickness d of the isolation layer 13 may be set to satisfy the following formula:

$$\tan(A2 - A1) < \frac{x}{d + gd}. \qquad (4)$$

In addition, the deflection degree of the light 151 by the first light deflection surface 111 will also depend on the angle of incidence A1, which will be affected by a curvature of the first light deflection surface 111 at a position where the light 151 is incident onto. Thus, in practice, parameters such as the refractive index n1 of the first substrate 11, the refractive index n2 of the isolation layer 13, the width x of the edge frame region 142, the thickness d of the isolation layer 13, the curvature of the first light deflection surface 111 and the like may be appropriately set so as to achieve a desired display effect of narrowed edge frame or non-edge frame.

Similarly, assuming that the most-left light 152 from the edge pixel 144 is transmitted through the first substrate 11 and incident onto the first light deflection surface 111 at an angle of incidence of B1, with an angle of refraction of B2, then according to the refraction law, the following formula is satisfied:

$$\frac{\sin B1}{\sin B2} = \frac{n2}{n1}. \qquad (5)$$

Also, when n2 is smaller than n1, the light 152 refracted by the first light deflection surface 111 will be also deflected towards the edge of the substrate 10. Deflection degree of the light 152 by the first light deflection surface 111 (for example, represented by (B2−B1)) also depends on the ratio of n2 to n1. Also in practice, according to the refraction law and geometric relationships, parameters such as the refractive index n1 of the first substrate 11, the refractive index n2 of the isolation layer 13, the width x of the edge frame region 142, the width p of the edge pixel 144, the thickness d of the isolation layer 13, the curvature of the first light deflection surface 111 and the like may be appropriately set so as to achieve a desired display effect of narrowed edge frame or non-edge frame. The detail derivation will not be repeatedly described.

As an example, the first light deflection surface 111 may be configured so that a sine value of an angle of incidence, at which light perpendicularly incident into the first substrate 11 from the edge portion of the image display region 141 of the display functional stacked layers 14 is incident onto the first light deflection surface 111, is smaller than a ratio of the refractive index of the isolation layer 13 to the refractive index of the first substrate 11. That is, angle of incidence, at which light perpendicularly incident into the first substrate 11 from the edge portion of the image display region 141 of the display functional stacked layers 14 is incident onto the first light deflection surface 111, is smaller than a critical angle for total reflection. As such, light perpendicularly incident into the first substrate 11 from the edge portion of the image display region 141 of the display functional stacked layers 14 may be prevented from being totally reflected at the first light deflection surface 111, thereby ensuring optical efficiency.

Light may be further deflected by the second light deflection surface 102 for a second time after it is deflected by the first light deflection surface 111. As an example, deflection direction of light by the second light deflection surface 102 may be opposite from that of light by the first light deflection surface 111. For example, when the refractive index of the isolation layer 13 is smaller than the refractive index of the cover plate 10, light deflected by the first light deflection surface 111 is deflected towards a center of the cover plate 10 by the second light deflection surface 102, as shown in FIG. 2. Accordingly, when a curvature of the first light deflection surface 111 is substantially the same as that of the second light deflection surface 102, light perpendicularly incident into the first substrate 11 from the edge portion of the image display region 141 of the display functional stacked layers 14 will be perpendicularly emitted out from the display panel after being deflected by the first light deflection surface 111 and the second light deflection surface 102 for two times. As such, a better visual comfort can be obtained for the viewer.

Figure 3:
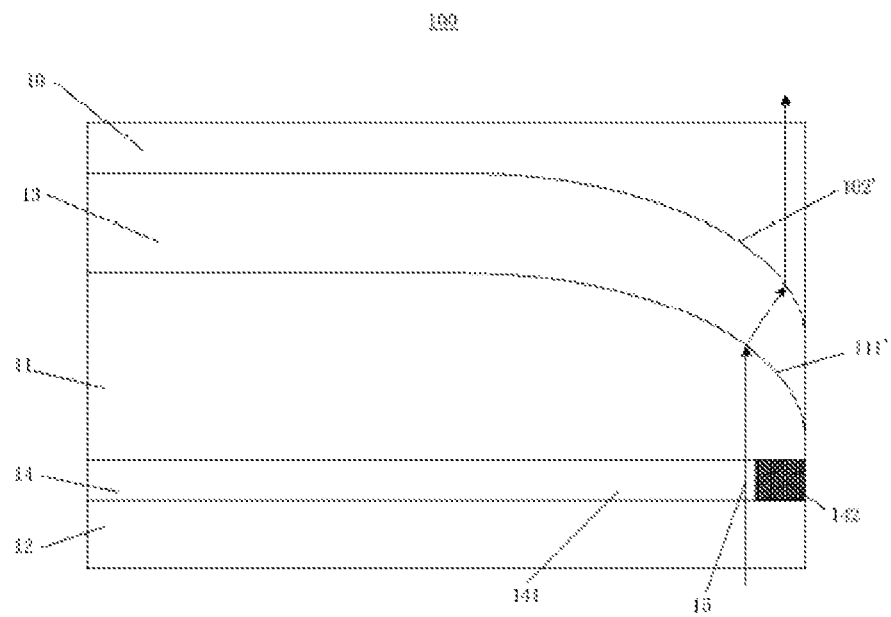
FIG. 3 is a schematic diagram showing a stacked arrangement of a display panel according to another embodiment of the present disclosure.

FIG. 3 shows another alternative example of a display panel according to the present disclosure. In this example, the refractive index of the isolation layer 13 may be larger than those of the first substrate 11 and the cover plate 10, and the first light deflection surface 111' and the second light deflection surface 102' are curved together towards the first substrate 11. When the refractive index of the isolation layer 13 may be larger than those of the first substrate 11 and the cover plate 10, an angle of refraction at which the light 15 from the image display region 141 of the display functional stacked layers 14 is refracted by the first light deflection surface 111' will be smaller than the angle of incidence, thus in order to deflect the light 15 towards the edge of the cover plate 10, the first light deflection surface 111' and the second light deflection surface 102' need to be curved towards the first substrate 11. Specific deflection of light by the first light deflection surface 111' and the second light deflection surface 102' is similar to that in the embodiment as described previously and thus will not be repeatedly described.

As an example, in order to prevent total reflection at the second light deflection surface 102', the second light deflection surface 102' may be configured so that a sine value of an angle of incidence, at which the light deflected by the first light deflection surface 111' is incident onto the second light deflection surface 102', is smaller than a ratio of the refractive index of the cover plate 10 to the refractive index of the isolation layer 13, that is, so that the angle of incidence is smaller than the critical angle for total reflection.

As an example, the first light deflection surfaces 111, 111' and the second light deflection surfaces 102, 102' may be configured so that parallel light from the edge portion of the image display region 141 of the display functional stacked layers 14 is still parallel light after deflected by the first light deflection surfaces 111, 111' and the second light deflection surfaces 102, 102', which may be achieved by adjusting curvatures of the first light deflection surfaces 111, 111' and the second light deflection surfaces 102, 102'. This will achieve a better display effect and avoid possible distortion at the edge of the display panel.

As an example, the first light deflection surfaces 111, 111' and the second light deflection surfaces 102, 102' may have substantially the same curvatures, or may be provided with different curvatures as required. In order to achieve a more accurate design, the first light deflection surfaces 111, 111' and/or the second light deflection surfaces 102, 102' may be provided with different curvatures at different positions thereof.

Figure 4:
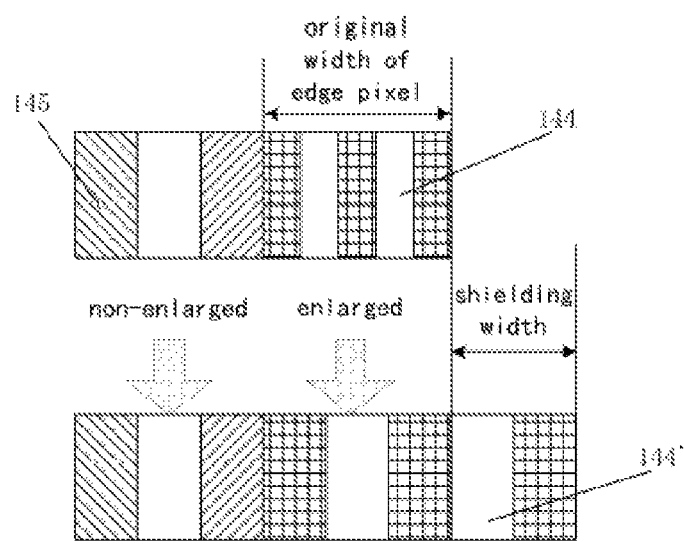
FIG. 4 is a schematic diagram showing exemplary edge pixels of a display panel according to an embodiment of the present disclosure.

Further, under actions of the first light deflection surface 111, 111' and the second light deflection surface 102, 102', the deflected light may be enlarged, which will contribute to covering more wider region better and increase shielding width so as to achieve a display effect of narrowed edge frame or non-edge frame. For example, as schematically shown in FIG. 4, the pixel 144 in the edge portion of the image display region 141 may be enlarged visually due to effects of the first light deflection surfaces 111, 111' and the second light deflection surfaces 102, 102'. Visually, a line width in the enlarged pixel 144' becomes larger than physical pixel 144. Meanwhile, pixels 145 in other portions of the image display region 141 are not enlarged by the first light deflection surfaces 111, 111' and the second light deflection surfaces 102, 102'. In order to compensate for the above visually enlarged effect, as an example, the pixels 144 in the edge portion of the image display region 141 of the display functional stacked layers 14 may be arranged more densely than those in other portions of the image display region 141 (for example, have a smaller line width). As such, the pixels 144 in the edge portion of the image display region 141 and the pixels 145 in other portions of the image display region 141 may become more uniform for the viewer, and edge distortion of the image is prevented.

In embodiment of the present disclosure, the isolation layer 13 may be made of a material which is at least partially transparent; for example, the isolation layer 13 is a glass layer or transparent adhesive layer. In practice, the material of the isolation layer 13 may be selected according to refractive indexes and arrangements of the first light deflection surfaces 111, 111' and the second light deflection surfaces 102, 102'. Alternatively, the isolation layer 13 may be also an air layer. As an example, the refractive index n1 of the first substrate 11 may be, for example, 1.5, 1.7 or 1.9. As an example, the refractive index n2 of the isolation layer 13 may be, for examplel, 1.3, 1.5, 1.7 or 1.9.

Figure 5:
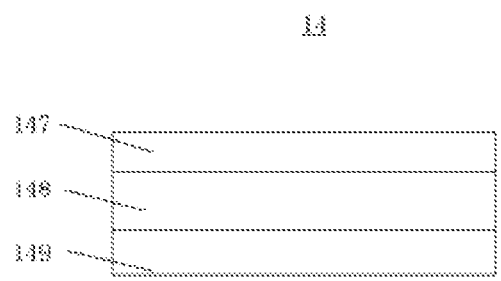
FIG. 5 is a schematic diagram showing exemplary display functional stacked layers of a display panel according to an embodiment of the present disclosure.

In embodiment of the present disclosure, the display functional stacked layers 14 may be liquid-crystal based display functional stacked layers, for example, may comprise in sequence: a color filter layer 147, a liquid crystal layer 148, a thin film transistor layer 149, and the like, as shown in FIG. 5. The display functional stacked layers may also include known stacked arrangements required for liquid crystal display such as a polarizer, for example. As an example, the first substrate 11 may be used as a color film (color filter) substrate, and the second substrate 12 may be used as an array substrate (TFT substrate).

In embodiment of the present disclosure, however, the display functional stacked layers 14 are not limited to liquid-crystal based display functional stacked layers, and may also be, for example, display functional stacked layers based on other display principles such as organic light-emitting diode or the like.

The display panel according to embodiments of the present disclosure may be a liquid crystal display panel, OLED display panel or the like.

Figure 6:
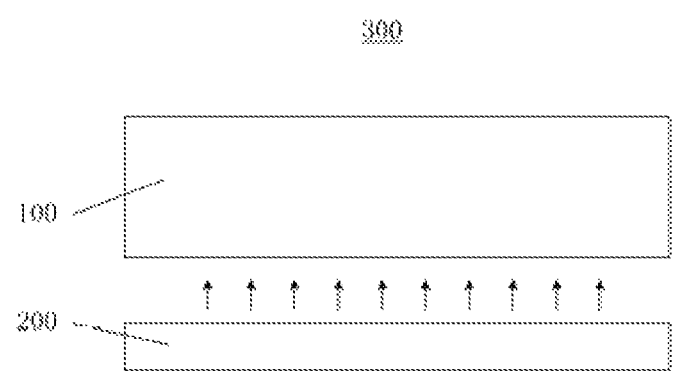
FIG. 6 is a schematic diagram of a display device according to an embodiment of the present disclosure.

Embodiments of the present disclosure further provide a display device 300. As shown in FIG. 6, the display device 300 may comprise: the display panel 100 in any of the embodiments as described above; and a backlight 200 provided outside of the second substrate 12 of the display panel 100. As an example, the backlight 200 may be directly adhered to an outer side of the second substrate 12 of the display panel 100, or may be arranged to be separate from the display panel 100. In one example, other stacked structures, for example, polarizer layer and the like, may be arranged between the backlight 200 and the second substrate 12.

It is noted that for purpose of convenient illustration, FIGS. 1-6 only show exemplary structures of the display panel at positions adjacent to one side edge thereof, and it will be understood that the structures of the display panel 100, for example, the first light deflection surfaces 111, 111', the second light deflection surfaces 102, 102' and the like, may be provided at positions at the peripheral edge of the display panel.

With the display panel and the display device according to the embodiments of the present disclosure, light is deflected so that the edge frame region of the display functional stacked layers is shielded so as to obtain a display effect of narrowed edge frame or non-edge frame visually. This can break the limitations of narrowing edge frame due to the arrangements of peripheral circuits of the display panel and the cutting allowance, and a greater degree of freedom is provided for achieving the display effect of narrowed edge frame or non-edge frame, thereby reducing process difficulty.

Although the present disclosure have been described with reference to the drawings, The embodiments disclosed in the drawings are only intended to illustrate exemplary embodiments of the present disclosure, and should not interpreted as be restrictive to the present disclosure.

Although several exemplary embodiments of the present disclosure have been shown and described, it would be appreciated by those skilled in the art that various changes or modifications may be made in these embodiments without departing from the principles and spirit of the present invention, the scope of which is defined in the claims and their equivalents.

What is claimed is:

1. A display panel, comprising:
   a cover plate, a first substrate and a second substrate stacked on top of one another, the cover plate and the second substrate being located on either side of the first substrate respectively and the cover plate being located on a light emitting side of the display panel;
   display functional stacked layers located between the first substrate and the second substrate, the display functional stacked layers having an image display region for displaying an image and an opaque edge frame region arranged to surround the image display region at edges of the display functional stacked layers;
   an isolation layer located between the first substrate and the cover plate, the isolation layer having a refractive index different from those of the first substrate and the cover plate, and
   wherein the first substrate is formed with a curved first light deflection surface at an edge thereof, the first light deflection surface being located on a side of the first substrate facing the isolation layer, covering the edge frame region and an edge portion of the image display region of the display functional stacked layers and being configured to deflect light from the edge portion of the image display region of the display functional stacked layers towards an edge of the cover plate,
   wherein the cover plate is formed with a curved second light deflection surface at the edge thereof, the second light deflection surface being located on a side of the cover plate facing the isolation layer, covering the edge frame region and an edge portion of the image display region of the display functional stacked layers and being configured to deflect light deflected by the first light deflection surface away from the edge of the cover plate, and
   wherein pixels in the edge portion of the image display region of the display function stacked layers are arranged more densely than those in other portions of the image display region.

2. The display panel according to claim 1, wherein the first light deflection surface and the second light deflection surface are configured so that a region of the cover plate from which the light deflected by the second light deflection surface is emitted out at least partially covers the edge frame region of the display functional stacked layers.

3. The display panel according to claim 2, wherein the first light deflection surface and the second light deflection surface are configured so that the region of the cover plate from which the light deflected by the second light deflection surface is emitted out completely covers the edge frame region of the display functional stacked layers.

4. The display panel according to claim 1, wherein the refractive index of the isolation layer is smaller than those of the first substrate and the cover plate, and the first light deflection surface and the second light deflection surface are curved together towards the cover plate.

5. The display panel according to claim 4, wherein the first light deflection surface is configured so that a sine value of an angle of incidence, at which light perpendicularly incident into the first substrate from the edge portion of the image display region of the display functional stacked layers is incident onto the first light deflection surface, is smaller than a ratio of the refractive index of the isolation layer to the refractive index of the first substrate.

6. The display panel according to claim 1, wherein the refractive index of the isolation layer is larger than those of the first substrate and the cover plate, and first light deflection surface and second light deflection surface are curved together towards the first substrate.

7. The display panel according to claim 6, wherein the second light deflection surface is configured so that a sine value of an angle of incidence, at which the light deflected by the first light deflection surface is incident onto the second light deflection surface, is smaller than a ratio of the refractive index of the cover plate to the refractive index of the isolation layer.

8. The display panel according to claim 1, wherein the first light deflection surface and the second light deflection surface are configured so that parallel light from the edge portion of the image display region of the display functional stacked layers is still parallel light after deflected by the first light deflection surface and the second light deflection surface.

9. The display panel according to claim 1, wherein the display functional stacked layers comprises in sequence:
   a color filter layer, a liquid crystal layer and a thin film transistor layer.

10. The display panel according to claim 1, wherein the isolation layer is a glass layer, an air layer or a transparent adhesive layer.

11. A display device, comprising:
    the display panel according to claim 1; and
    a backlight provided outside of the second substrate of the display panel.

* * * * *